US011614851B2

(12) United States Patent
Cervelli et al.

(10) Patent No.: US 11,614,851 B2
(45) Date of Patent: Mar. 28, 2023

(54) APPROACHES FOR CONDUCTING INVESTIGATIONS CONCERNING UNAUTHORIZED ENTRY

(71) Applicant: Palantir Technologies Inc., Denver, CO (US)

(72) Inventors: Daniel Cervelli, Wanaka (NZ); Allen Chang, Mountain View, CA (US); Andrew Elder, Greenwood Village, CO (US); Andrew Lampert, Pascoe Vale South (AU); John Carrino, Redwood City, CA (US); Peter Austin, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/067,456

(22) Filed: Oct. 9, 2020

(65) Prior Publication Data

US 2021/0109633 A1    Apr. 15, 2021

Related U.S. Application Data

(60) Provisional application No. 62/913,096, filed on Oct. 9, 2019.

(51) Int. Cl.
| | |
|---|---|
| *G06F 3/048* | (2013.01) |
| *G06F 3/0483* | (2013.01) |
| *G06F 16/29* | (2019.01) |
| *G06F 3/0482* | (2013.01) |
| *G06F 3/0484* | (2022.01) |

(Continued)

(52) U.S. Cl.
CPC .......... *G06F 3/0483* (2013.01); *G06F 3/0482* (2013.01); *G06F 3/0484* (2013.01); *G06F 16/29* (2019.01); *G06F 21/34* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 8,998,084 B2 * | 4/2015 | McIntyre | G06F 16/5866 705/28 |
| 10,555,393 B1 * | 2/2020 | Fu | F21V 33/0052 |
| 11,024,105 B1 * | 6/2021 | Brand | G07C 9/10 |

(Continued)

OTHER PUBLICATIONS

Extended European Search Report for EP Application No. 20200914.8 dated Feb. 22, 2021, 9 pages.

*Primary Examiner* — Hua Lu
(74) *Attorney, Agent, or Firm* — Sheppard Mullin Richter & Hampton LLP

(57) ABSTRACT

Systems and methods are provided for providing an interface for conducting an investigation concerning at least one suspected unauthorized entry to an environment. A set of tabbed sub-interfaces for accessing information related to the environment can be provided in a first region of the interface. An interactive map of the environment can be provided in a second region of the interface, wherein the interactive map identifies locations within the environment that are associated with access control readers, and wherein the interactive map identifies locations within the environment that are associated with respective cameras that capture visual data describing those locations.

15 Claims, 15 Drawing Sheets

(51) Int. Cl.
*G06F 21/34* (2013.01)
*H04N 7/18* (2006.01)

(56) References Cited

U.S. PATENT DOCUMENTS

| | | | |
|---|---|---|---|
| 2005/0035862 A1* | 2/2005 | Wildman | G08B 13/2462 340/572.1 |
| 2007/0132586 A1* | 6/2007 | Plocher | G08B 25/14 340/539.2 |
| 2008/0298571 A1* | 12/2008 | Kurtz | G06F 3/017 348/E7.083 |
| 2009/0196464 A1* | 8/2009 | Dimitrova | G06K 9/627 382/118 |
| 2011/0317872 A1* | 12/2011 | Free | G06V 40/172 382/118 |
| 2012/0140068 A1* | 6/2012 | Monroe | H04N 7/183 348/143 |
| 2012/0281095 A1* | 11/2012 | Trenciansky | H04N 7/18 348/143 |
| 2012/0318866 A1* | 12/2012 | McIntyre | G06Q 50/18 235/385 |
| 2014/0152836 A1* | 6/2014 | Morris | G08B 13/19608 348/159 |
| 2014/0282679 A1* | 9/2014 | Kohlenberg | H04N 1/00347 725/25 |
| 2014/0365976 A1* | 12/2014 | Morrison | G05B 15/02 715/854 |
| 2015/0077550 A1* | 3/2015 | Apelbaum | G06K 9/6289 348/143 |
| 2015/0287296 A1* | 10/2015 | Hall | G07C 9/20 340/541 |
| 2015/0350902 A1* | 12/2015 | Baxley | H04W 4/90 726/7 |
| 2016/0224843 A1* | 8/2016 | Boigas | G06V 10/751 |
| 2017/0124385 A1* | 5/2017 | Ganong | G06V 40/167 |
| 2017/0148241 A1* | 5/2017 | Kerning | H04W 12/08 |
| 2017/0180348 A1* | 6/2017 | Piccolotto | G06F 21/32 |
| 2017/0193810 A1* | 7/2017 | Cao | G08B 29/185 |
| 2017/0225336 A1 | 8/2017 | Deyle et al. | |
| 2017/0270722 A1* | 9/2017 | Tse | G08B 21/18 |
| 2017/0321923 A1* | 11/2017 | Wiens-Kind | G08B 27/006 |
| 2018/0124361 A1* | 5/2018 | Simon | H04N 21/42684 |
| 2019/0108735 A1* | 4/2019 | Xu | G06V 40/166 |
| 2019/0147185 A1* | 5/2019 | Cai | G06V 40/173 726/30 |
| 2019/0174099 A1* | 6/2019 | Hodge | G06Q 40/08 |
| 2019/0244459 A1* | 8/2019 | Horgan | G05B 17/02 |
| 2019/0244492 A1* | 8/2019 | Horgan | G08B 13/08 |
| 2019/0246075 A1* | 8/2019 | Khadloya | G06N 3/006 |
| 2019/0278976 A1* | 9/2019 | Khadloya | G06V 20/52 |
| 2019/0302981 A1 | 10/2019 | Storr et al. | |
| 2019/0304042 A1* | 10/2019 | Santell | G06Q 50/26 |
| 2019/0355193 A1* | 11/2019 | Kirsch | G06V 20/52 |
| 2020/0053325 A1* | 2/2020 | Deyle | G05D 1/0088 |
| 2020/0159723 A1* | 5/2020 | Goyal | G06F 8/38 |
| 2020/0184227 A1* | 6/2020 | Felhi | G06V 40/10 |
| 2020/0234523 A1* | 7/2020 | Ma | G06F 16/288 |
| 2020/0344238 A1* | 10/2020 | Ainsworth | A61B 5/165 |
| 2020/0364479 A1* | 11/2020 | Tseng | G06V 10/774 |
| 2021/0056231 A1* | 2/2021 | Kwatra | H04W 12/63 |

\* cited by examiner

FIGURE 3E

APPROACHES FOR CONDUCTING INVESTIGATIONS CONCERNING UNAUTHORIZED ENTRY

CROSS-REFERENCE TO RELATED APPLICATION

This application claims the benefit under 35 U.S.C. 119(e) of U.S. Provisional Application No. 62/913,096, filed Oct. 9, 2019, the content of which is hereby incorporated in its entirety.

FIELD OF THE INVENTION

This disclosure relates to user interfaces and related technologies for conducting investigations concerning unauthorized entry to a secure environment.

BACKGROUND

Under conventional approaches, humans conducting investigations are typically limited to data that is recorded and made accessible. This data typically needs to be evaluated and interpreted by humans as an investigation is conducted. For example, an investigation may concern an unauthorized entity that accessed a building using an authorized entity's access badge. In this example, the investigation may involve manually reviewing badge reader logs to determine locations within the building that were visited by the unauthorized entity, including any points of ingress or egress. Such strictly manual efforts can result in investigations that cannot be feasibly completed within a reasonable amount of time or investigations that provide incomplete or incorrect results due to unchecked human error.

SUMMARY

Various embodiments of the present disclosure can include systems, methods, and non-transitory computer readable media configured to provide an interface for conducting an investigation concerning at least one suspected unauthorized entry to an environment. A set of tabbed sub-interfaces for accessing information related to the environment can be provided in a first region of the interface. An interactive map of the environment can be provided in a second region of the interface, wherein the interactive map identifies locations within the environment that are associated with access control readers, and wherein the interactive map identifies locations within the environment that are associated with respective cameras that capture visual data describing those locations.

In an embodiment, the set of tabbed sub-interfaces includes a first sub-interface for accessing one or more floorplans describing the environment, wherein an interactive map of a floorplan selected from the first sub-interface is displayed in the second region of the interface.

In an embodiment, the set of tabbed sub-interfaces includes a second sub-interface for accessing information describing events associated with the environment.

In an embodiment, an event identifies a badge that was read by an access control reader associated with the environment or an entity that was recognized based on visual data captured by a camera associated with the environment.

In an embodiment, the set of tabbed sub-interfaces includes a third sub-interface for accessing information describing entities that are permitted to access the environment, the information indicating at least when a badge associated with a given entity was read by an access control reader and when the entity was recognized in visual data captured by a camera associated with the environment.

In an embodiment, the set of tabbed sub-interfaces includes a fourth sub-interface for accessing information that has been associated with the investigation, wherein at least some of the information is identified by a user of the interface.

In an embodiment, the systems, methods, and non-transitory computer readable media are further configured to perform determining that a badge read by an access control reader is associated with an authorized entity; determining that an entity that presented the badge to the access control reader fails to match a facial profile associated with the authorized entity; and generating one or more alerts that describe a suspected unauthorized entry to the environment.

In an embodiment, the systems, methods, and non-transitory computer readable media are further configured to perform providing at least one option in the interactive map for viewing recorded or live visual data captured by a camera associated with the environment.

In an embodiment, wherein faces of entities represented in the visual data are obfuscated by default, and wherein the interface provides one or more options for submitting one or more justifications to selectively reveal the faces of the entities.

In an embodiment, wherein the interface provides one or more options for associating information related to the environment with the investigation, the one or more options including at least a first option to associate an event identifying a badge that was read by an access control reader with the investigation and at least a second option to associate visual data in which an entity was identified with the investigation.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3A-3J illustrate example interfaces, in accordance with various embodiments.

DETAILED DESCRIPTION

Under conventional approaches, humans conducting investigations are typically limited to data that is recorded and made accessible. This data typically needs to be evaluated and interpreted by human analysts as an investigation is conducted. For example, an investigation may concern an unauthorized entity that accessed a facility using an authorized entity's access badge. In this example, the investigation may involve manually reviewing badge reader logs to determine locations within the facility that were visited by the unauthorized entity, including any points of ingress or egress. These visited locations may be correlated with other types of information in furtherance of the investigation. For example, the visited locations may be evaluated in reference to a map of the facility to learn additional details concerning the unauthorized entity. In another example, the visited locations may be evaluated in reference to visual footage captured by cameras within the facility. Conventionally, human analysts are tasked with reviewing lengthy visual footage to learn additional details concerning the unauthorized entity. Such strictly manual efforts, can result in investigations that cannot feasibly be completed within a reasonable amount of time or investigations that provide incomplete or incorrect results due to unchecked human error.

Figure 1A:
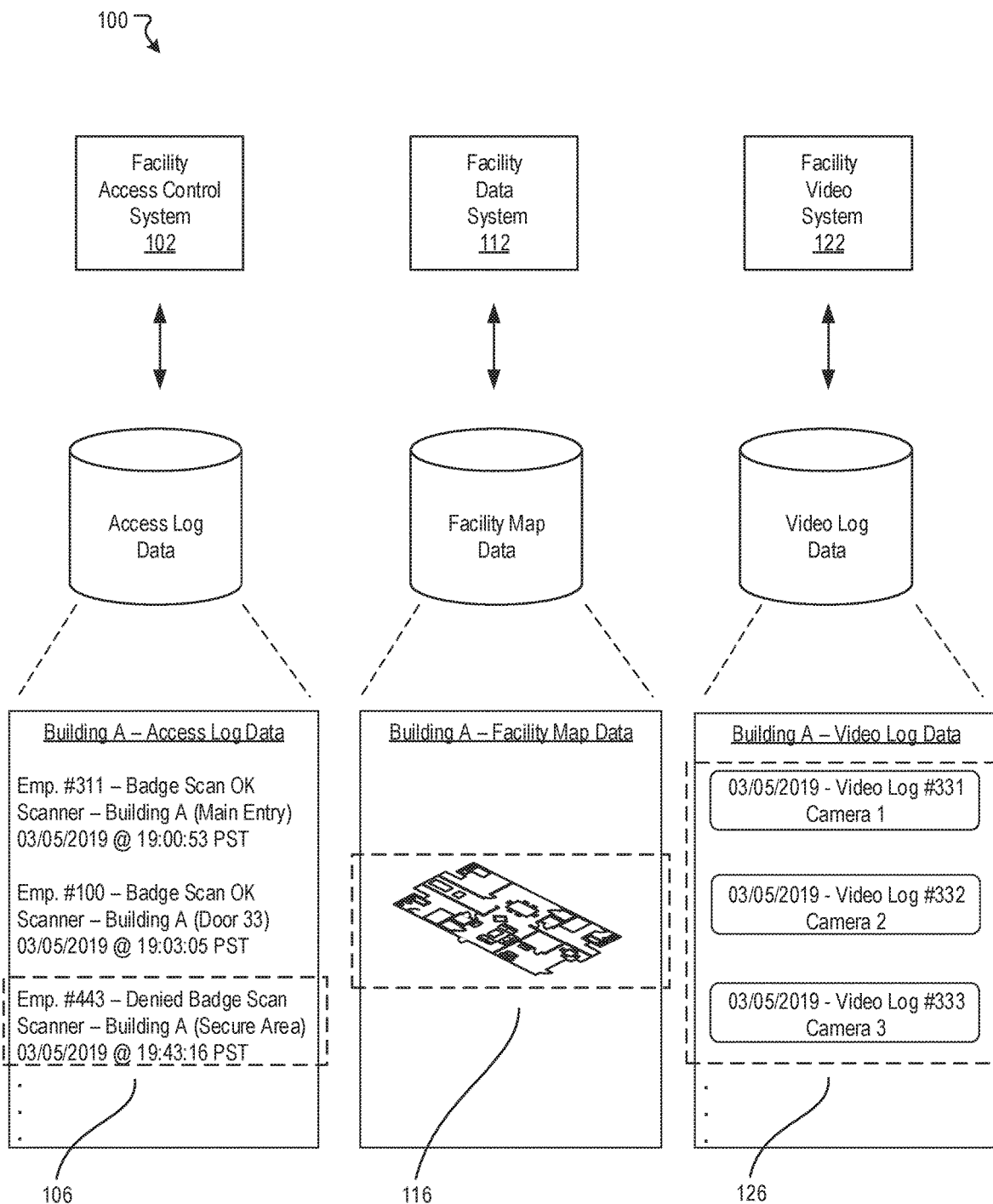
FIGS. 1A-1B illustrate example diagrams, in accordance with various embodiments.

For example, FIG. 1A illustrates example systems that can be maintained for a facility, including a facility access control system 102, a facility data system 112, and a facility video system 122. For instance, the facility access control system 102 can manage controlled access to and within a facility based on some credential, such as an access badge. In this example, the facility access control system 102 can store access logs that describe badge swipes made at badge readers associated with the facility. The facility data system 112 may store information such as building maps and blueprints. Further, the facility video system 122 can store and manage video data captured by cameras associated with the facility. Typically, facility systems, such as the facility access control system 102, the facility data system 112, and the facility video system 122 are disparate and thus maintained separately. In this example, a human analyst may be tasked with conducting an investigation involving a suspicious attempt by an entity to access a secure area using an access badge associated with an employee #443. Here, the human analyst may need to individually query each system for information in furtherance of the investigation. For example, the human analyst can query the facility access control system 102 to identify an access log entry 106 indicating an attempt to access the secure area using the access badge associated with employee #443. The human analyst can also query the facility data system 112 to access map information 116 to learn geospatial details about the secure area related to the investigation. The map information 116 may also indicate locations of cameras that potentially capture visual data of the secure area and areas surrounding the secure area. The human analyst can use such information when querying the facility video system 122 for video logs that can benefit the investigation. For instance, the human analyst can attempt to identify relevant video logs 126 for further review based on a timestamp associated with the access log entry 106 and camera locations determined from the map information 116. Even after identifying the relevant video logs 126, the human analyst will typically still need to review each of the potentially lengthy video logs for visual information that can aid the investigation. As a result, such conventional approaches to conducting investigations involving secured environments can be ineffective, time-consuming, and difficult to complete given the vast amount of information that typically needs to be evaluated and correlated. Such limitations can result in investigations that cannot feasibly be completed within a reasonable amount of time or investigations that provide incomplete or incorrect results due to unchecked human error.

Figure 1B:
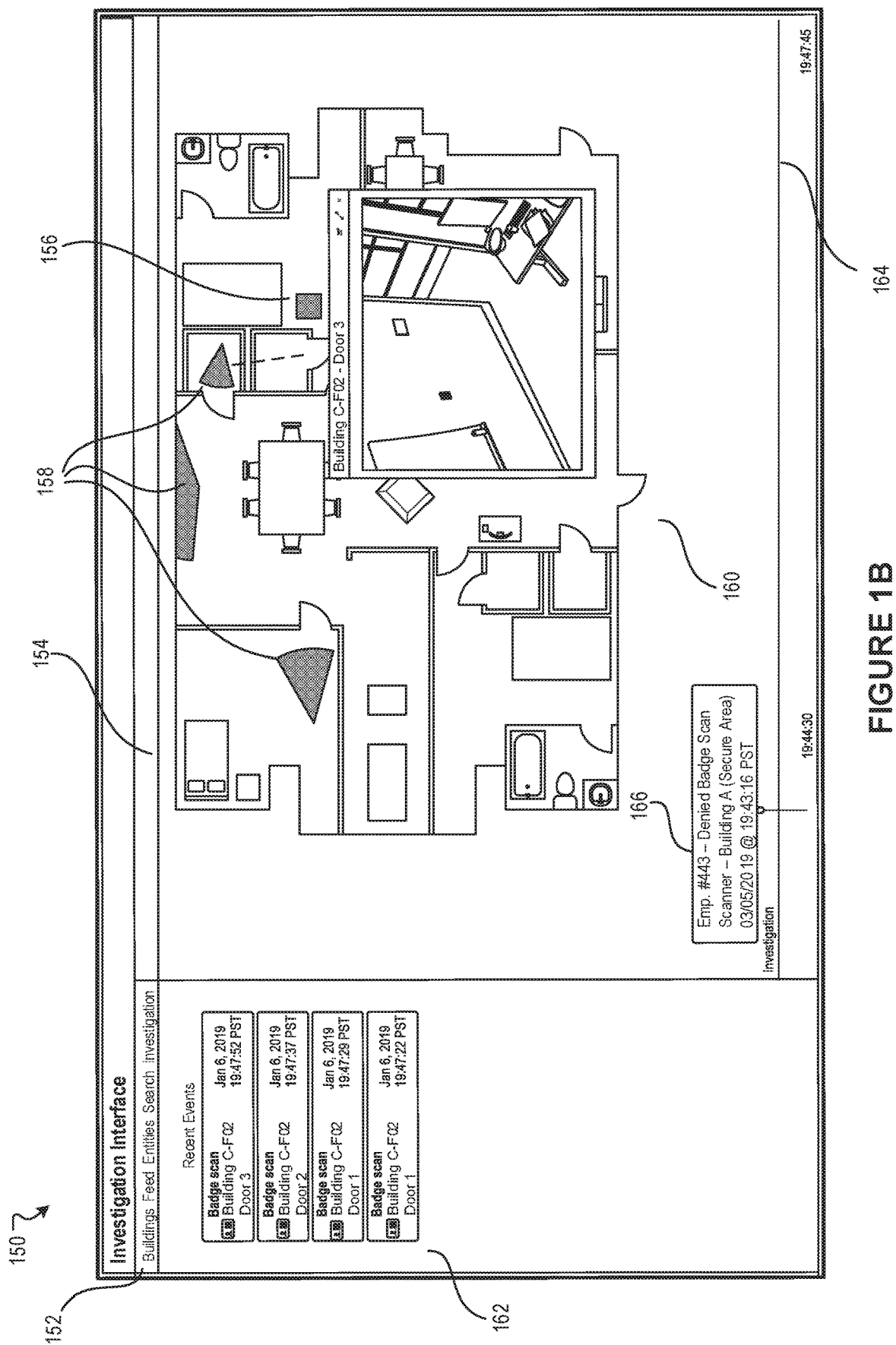

A claimed solution rooted in computer technology overcomes problems specifically arising in the realm of computer technology. In various embodiments, an interface 150 for conducting investigations can be provided, as illustrated in the example of FIG. 1B. The interface 150 can provide users with unified access to various disparate information for use in conducting investigations involving unauthorized access to and within some physical environment, for example, using an access badge or some other authentication credential. For example, the interface 150 can provide a set of tabs 152 for accessing various information. The tabs 152 can include a first tab for accessing information related to a particular environment (e.g., interactive maps of buildings, floorplans, etc.), a second tab for accessing information describing events associated with the environment (e.g., badge scan events), a third tab for accessing information describing entities (e.g., employees) that are permitted to access the environment, a fourth tab for accessing a search interface, and a fifth tab for accessing information that has been tagged or associated with a particular investigation.

In the example of FIG. 1B, the environment may be a building that has multiple doors with respective access badge readers. Further, each door can be associated with one or more cameras that capture visual data of those entering and exiting through the door. In this example, a user interacting with the interface 150 can access an interactive map 154 of the building. The interactive map 154 can identify secured locations within the building associated with access badge readers 156. The interactive map 154 can also identify locations of cameras 158 that capture visual data (e.g., images, videos) within the building. The user can navigate the interactive map 154 to determine and plot locations visited by unauthorized entities within the building. The user can also navigate the interactive map 154 to view visual data captured at different camera locations 158 within the environment. For example, the user can select a particular camera location to view a video feed 160 captured by that camera. The interface 150 can provide access to numerous additional features that can aid investigations. For example, the interface 150 can provide a region for viewing various types of events 162 associated with the building, such as badge scans read by the access badge readers 156. The interface 150 can also provide access to an interactive timeline 164 of events detected in the video feed 160, including events 166 indicating when and where a given badge was swiped. The user conducting the investigation can interact with the interface 150 to tag various types of information to be included in the investigation. For instance, the user can tag suspicious badge events and visual data as part of the investigation. In various embodiments, the interface 150 can be supported by any conventional facial recognition technology to assist human investigators with their investigations. In such embodiments, the interface 150 can implement myriad "privacy by design" features to modify and override various functionality provided by the underlying face recognition technology in an effort to safeguard privacy and civil liberty concerns. For example, the interface 150 can provide human investigators with facial recognition predictions and corresponding confidence scores (or other appropriate validation metrics) to clearly represent to systems users the reliability of facial detections as determined from captured visual data. These predictions may indicate whether a facial identity of a user that swiped an authorized badge is consistent with a facial profile associated with the authorized badge as matched to an existing store of images. In another example, the interface 150 can, by default, mask (or obfuscate) faces in visual data that are not associated with individuals on a watchlist. In these instances, the user interacting with the interface 150 may be asked to provide one or more justifications before being permitted to view masked (or obfuscated) faces. More details describing the interface 150 are provided below in reference to the interface engine 206 of FIG. 2.

Figure 2:
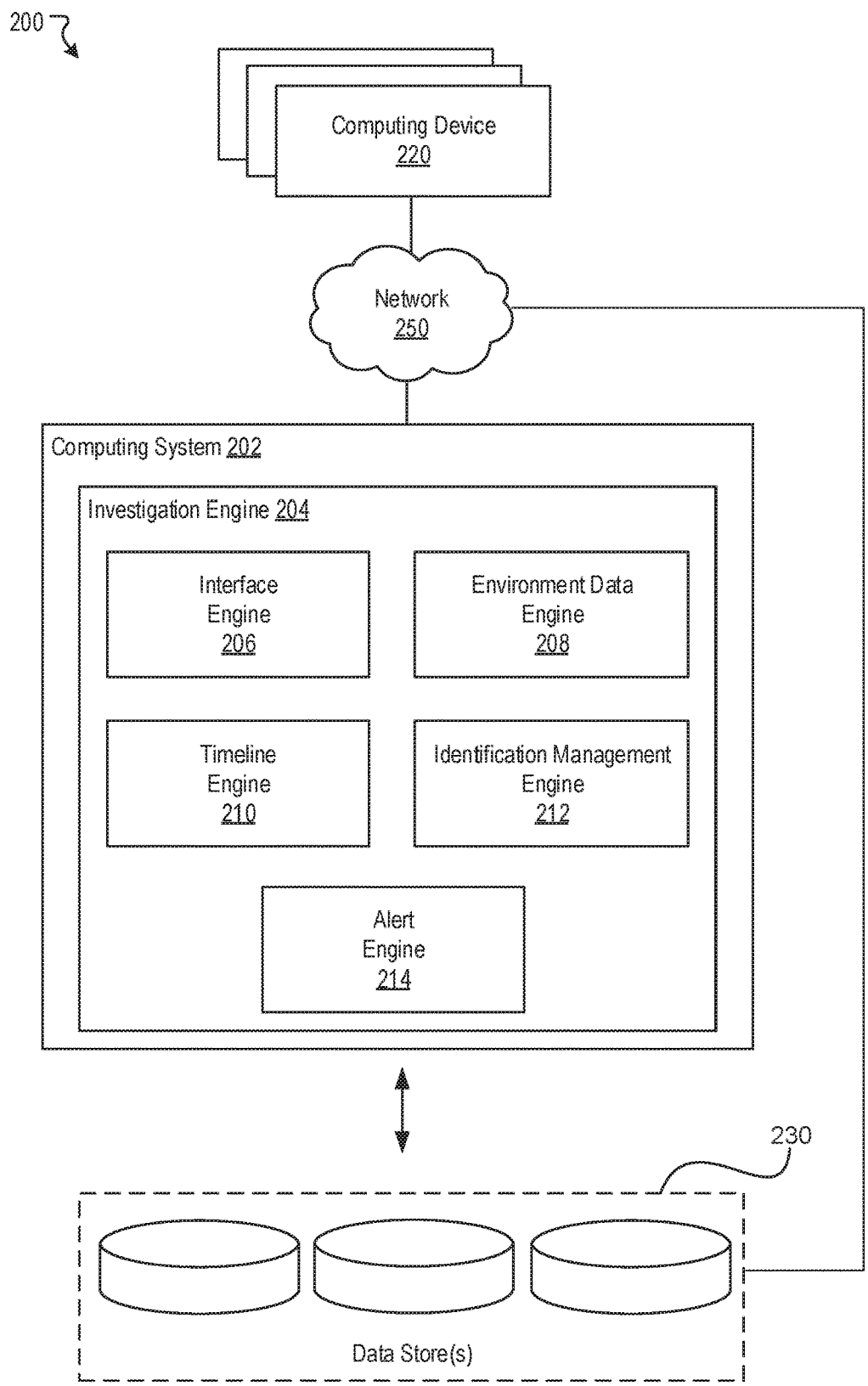
FIG. 2 illustrates an example computing environment, in accordance with various embodiments.

FIG. 2 illustrates an example environment 200, in accordance with various embodiments. The example environment 200 can include at least a computing system 202 and at least one computing device 220. The computing system 202 and the computing device 220 can each include one or more processors and memory. The processors can be configured to perform various operations by interpreting machine-readable instructions. The computing system 202 can access one or more data stores 230. In general, a data store may be any device in which data can be stored and from which data can be retrieved. In some embodiments, the data stores 230 may store and manage various data used by the investigation engine 204, such as data managed by the facility access control system 102, facility data system 112, and facility video system 122 of FIG. 1A. For example, the data stores 230 can store access log data for a facility (e.g., logs generated by access badge readers), map data associated with the facility (e.g., floorplans, blueprints, etc.), and visual data captured by cameras associated with the facility. In some embodiments, such data may be managed in an object graph which may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. The computing system 202, the computing device 220, and the data stores 230 may be accessible either directly or over a network 250. The network 250 may be any wired or wireless network through which data can be sent and received (e.g., the Internet, local area network, etc.). The computing system 202 can be configured to process requests received from the computing device 220. For example, the requests may be generated by a user operating the computing device 220 or from software applications running on the computing device 220. In various embodiments, such requests can be related to investigations involving unauthorized access to and within secured facilities, as provided by an investigation engine 204. In various embodiments, the investigation engine 204 can include an interface engine 206, an environment data engine 208, a timeline engine 210, an identification management engine 212, and an alert engine 214. The investigation engine 204 and its sub-engines can be executed by the processor(s) of the computing system 202 to perform various operations. In general, the investigation engine 204 and its sub-engines can be implemented, in whole or in part, as software that is capable of running on one or more computing devices or systems. In one example, the investigation engine 204 its sub-engines may be implemented as or within a software application running on one or more computing devices 220 (e.g., user or client devices) and/or one or more servers (e.g., cloud servers). Many variations are possible.

Figure 3A:
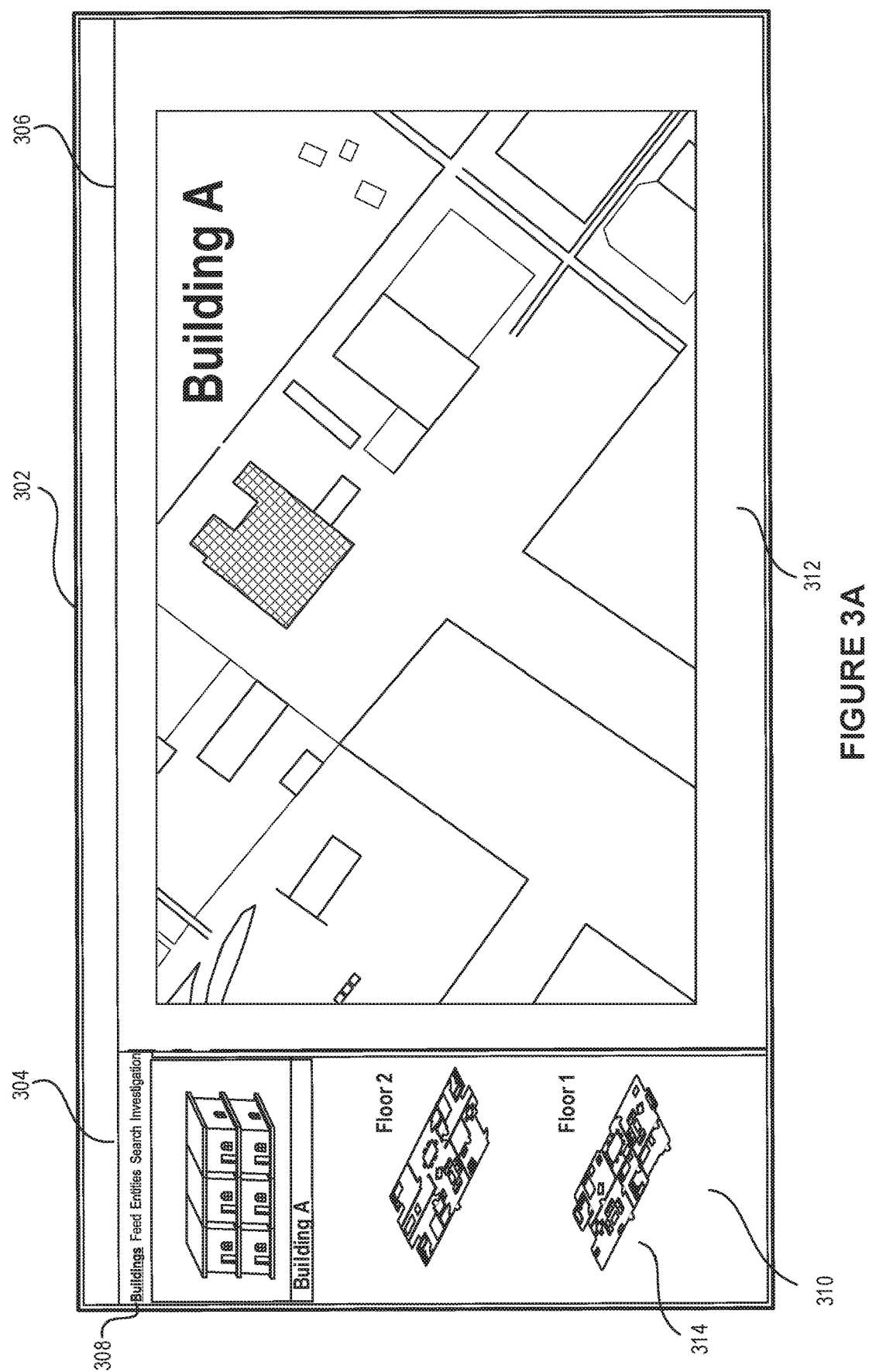
Figure 3B:
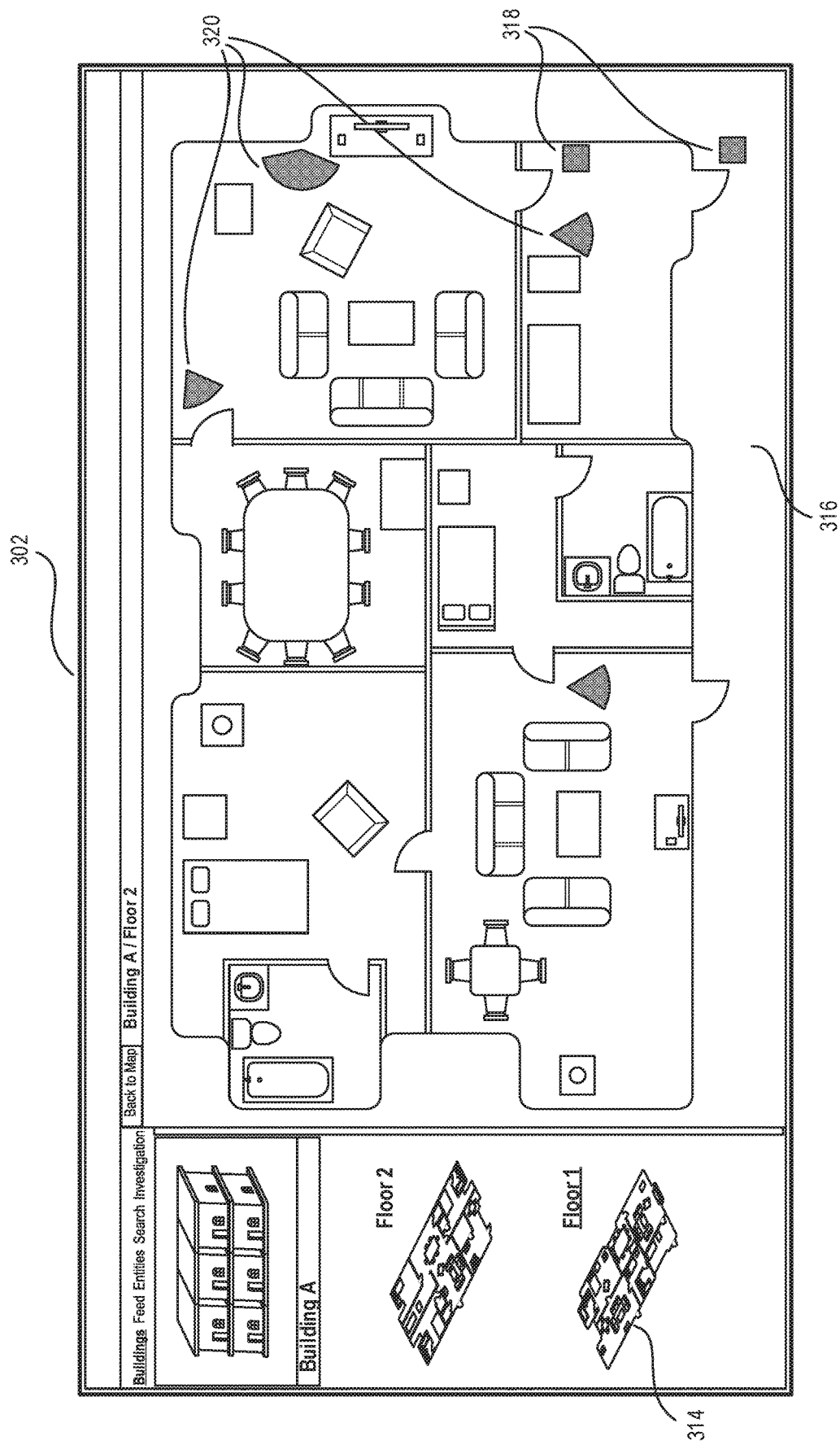
Figure 3C:
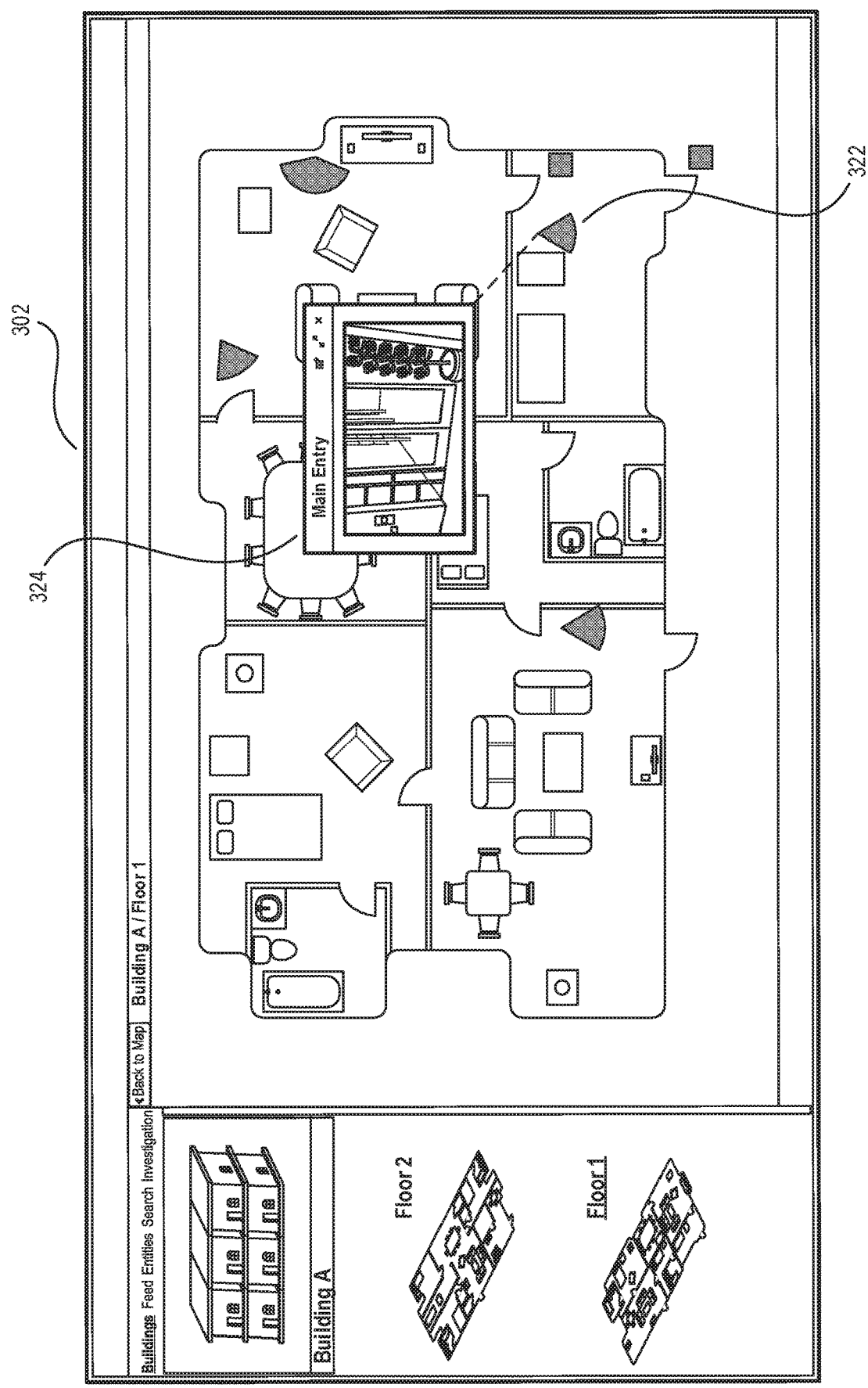

The interface engine 206 can be configured to generate and provide interfaces (e.g., graphical user interfaces) through which various information can be accessed and visualized. For example, the interface engine 206 can provide an interface 302 as shown in the example of FIG. 3A. The interface 302 can be accessed using a software application (e.g., investigation application, web browser, etc.) running on the computing system 202 and through a display screen associated with the computing system 202. In some embodiments, the interface 302 can be accessed through a software application running on the computing device 220 over one or more networks. The interface 302 can provide users with the ability to conduct investigations that concern some unauthorized entry into and within a secure facility (e.g., environment, building, etc.). In various embodiments, the interface 302 can provide users with access to many types of information that may be needed when conducting such investigations. As shown in the example of FIG. 3A, the interface 302 can include a first region 304 and a second region 306. The first region 304 can provide access to a number of tabbed sub-interfaces. For example, the first region 304 can provide a set of tabs 308 for accessing various information. The tabs 308 can include a first tab for accessing information related to the secure facility (e.g., interactive maps of buildings, floorplans, etc.), a second tab for accessing information describing events associated with the secure facility (e.g., badge scan events), a third tab for accessing information describing entities (e.g., employees) that are permitted to access the secure facility, a fourth tab for accessing a search interface, and a fifth tab for accessing information that has been tagged or associated with an ongoing investigation concerning some unauthorized entry involving the secure facility. In the example of FIG. 3A, a user interacting with the interface 302 has selected the first tab to access map information 310 associated with the secure facility. The map information 310 can provide visual floorplans for different floors of the secure facility. The second region 306 of the interface 302 can provide access to an interactive geographic map 312 associated with secure facility. In this example, the user can select a given floorplan 314 from the first region 304 to view a more detailed interactive map 316 of the selected floorplan 314, as illustrated in the example of FIG. 3B. As shown, the interactive map 316 can provide a top-down view of the selected floorplan 314. The interactive map 316 can also identify secured areas located within the selected floorplan 314 including locations 318 that are associated with access control mechanisms (e.g., access badge readers) and locations 320 that are associated with cameras that capture visual data (e.g., images, video) of those locations. In some embodiments, the interactive map 316 can visually indicate respective angles of view associated with such cameras. The user can interact with the interactive map 316, for example, by zooming, panning, and scrolling. In some embodiments, the user can select a given camera location to view video feeds captured by that camera. For example, FIG. 3C illustrates a video feed 324 shown within the interface 302 in response to a user selection of a camera location 322.

Figure 3D:
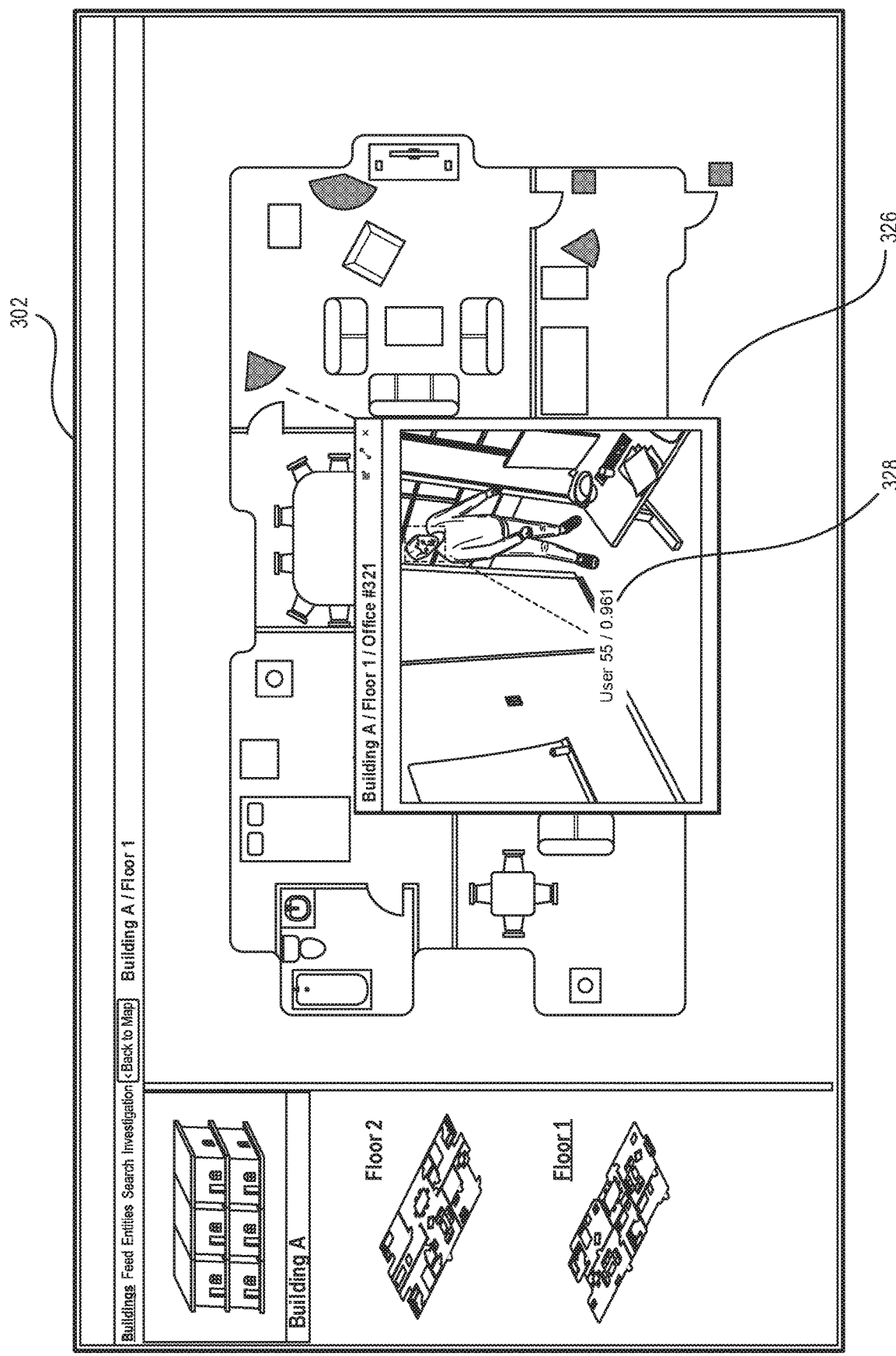

In some embodiments, the interface engine 206 can be supported using conventional face recognition technology to aid users conducting investigations. For example, face recognition information 328 can be shown in a video feed 326 being accessed through the interface 302 when appropriate, as illustrated in the example of FIG. 3D. The face recognition information 328 can provide a predicted identification of a human detected in the video feed 326 as well as a corresponding confidence score associated with the prediction. As mentioned, the interface 302 can implement numerous "privacy by design" features to safeguard privacy and civil liberty concerns that can arise when applying face recognition technology. More details describing such features are provided below in reference to the identification management engine 212.

Figure 3E:
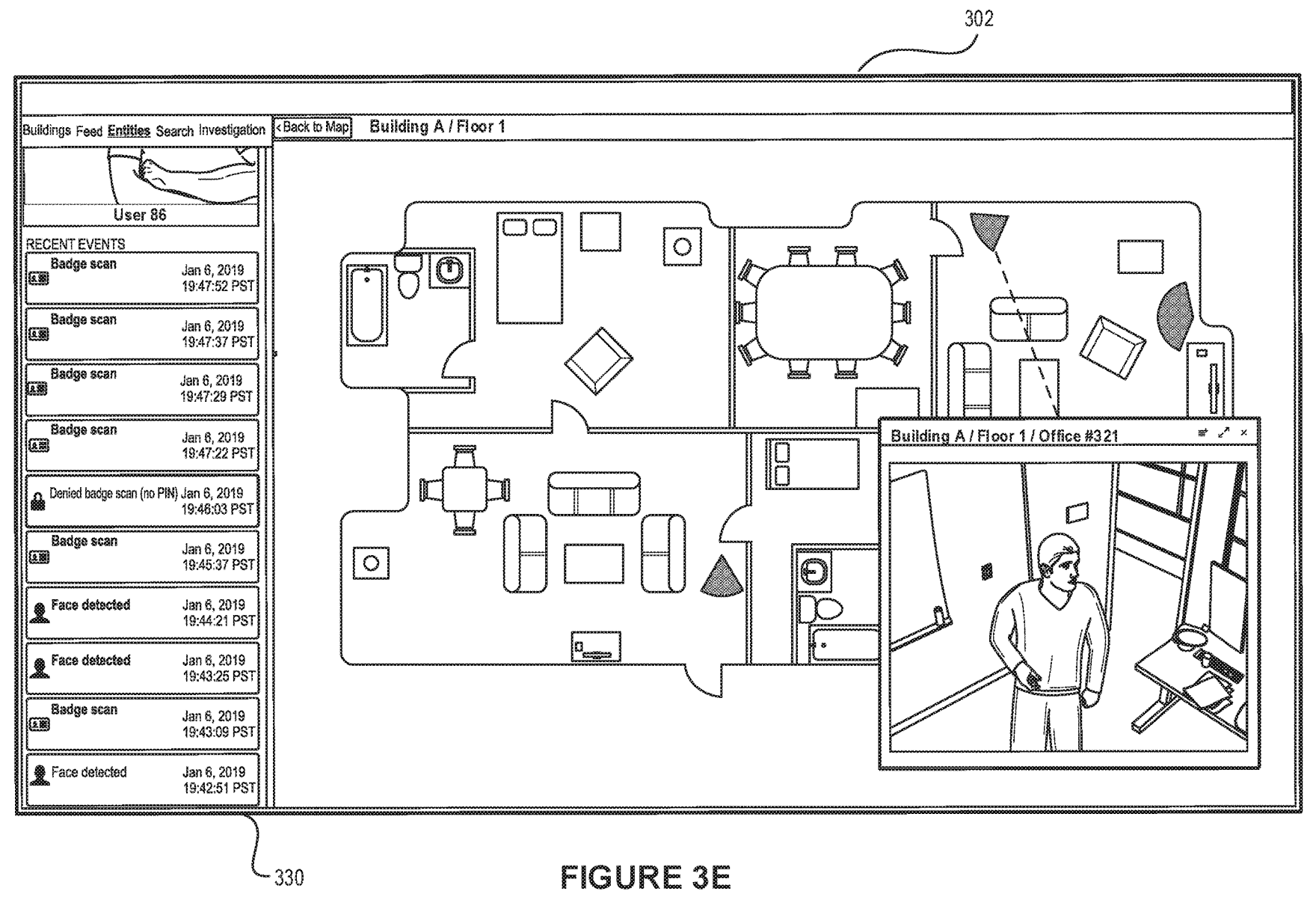

In various embodiments, the user interacting with the interface 302 can select a tab to view access control events associated with the secure facility. For example, the access control events can indicate badge scans detected by various access badge readers associated with the secure facility. In some embodiments, the access control events can be filtered based on entities (e.g., employees) that are permitted to access the secure facility. For example, FIG. 3E illustrates example access control events 330 related to an entity "User 86". In some embodiments, an access control event may indicate when the entity accessed the secure facility or a location within the secure facility, for example, using a credential such as an access badge. In some embodiments, when appropriate, an access control event may indicate when a facial geometry associated with the entity was recognized based on visual data captured by cameras associated with the secure facility. Many variations are possible.

Figure 3F:
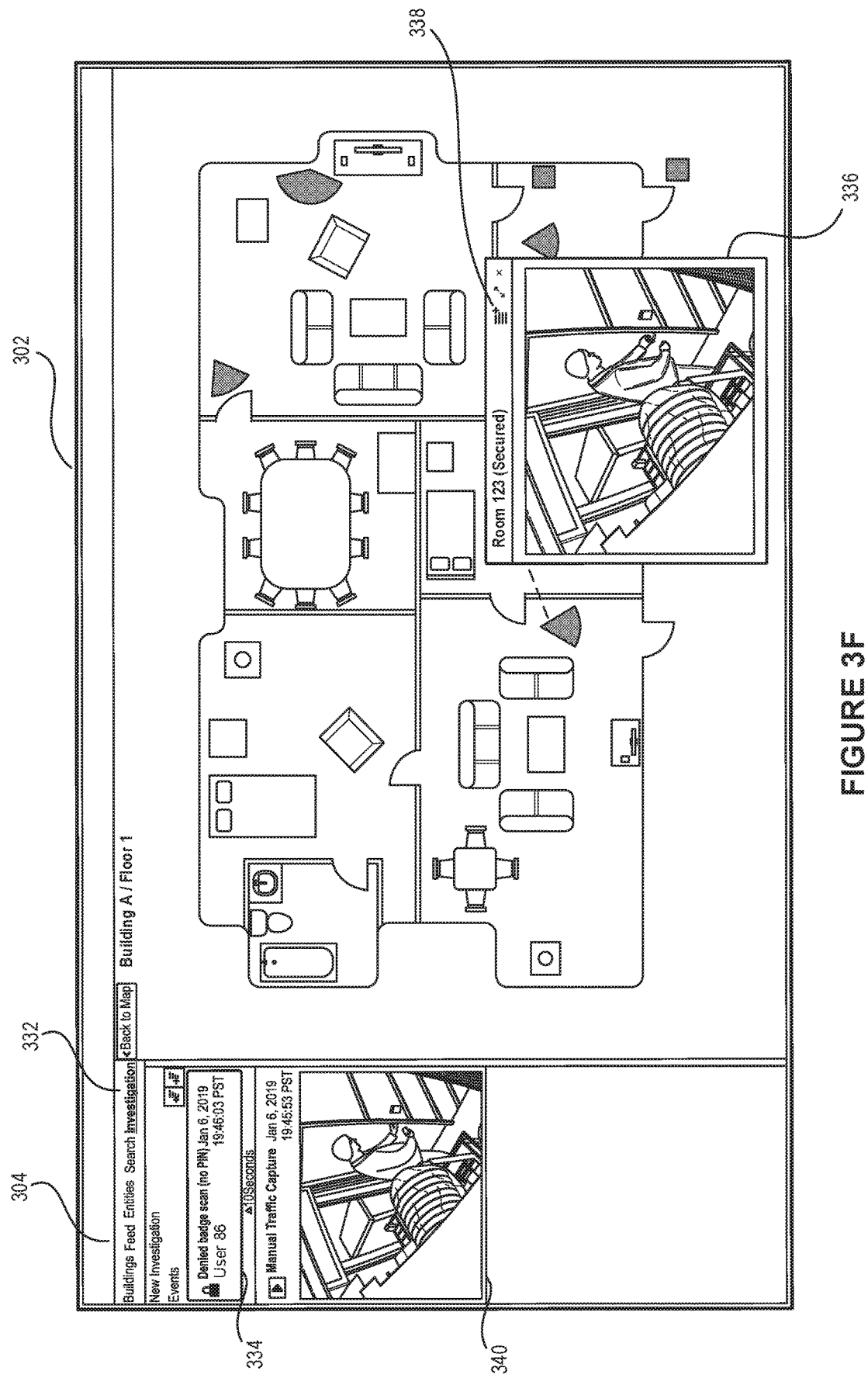

As mentioned, various information accessible through the interface 302 can be tagged (or associated) with an investigation being conducted. In general, information associated with an investigation can be accessed from an investigation tab 332 in the first region 304 of the interface 302, as illustrated in the example of FIG. 3F. As an example, the user interacting with the interface 302 may identify a suspicious access control event corresponding to a denied badge scan that warrants further investigation. In this example, the user can select an option to add the suspicious access control event to the investigation. As a result, information 334 corresponding to the suspicious access control event can be associated with the investigation and made accessible through the investigation tab 332 to users tasked with conducting the investigation. In another example, the user may identify suspicious activity in a video feed 336 being accessed through the interface 302. In this example, the user can similarly select an option 338 to associate the video feed 336 with the investigation in its entirety or a portion thereof (e.g., one or more still image captures or video clips). As a result, information 340 corresponding to the video feed 336, including any captured portions, can be associated with the investigation and made accessible through the investigation tab 332 to users collaborating on the investigation.

The environment data engine 208 can be configured to obtain information that can be made accessible to users through interfaces provided by the interface engine 206. In some embodiments, such information may be obtained from disparate data sources associated with a secure facility, as described in reference to FIG. 1A. For example, the environment data engine 208 can obtain access control information from conventional access control systems associated with the secure facility. The access control information can indicate when credentials (e.g., an access badge) associated with a given entity were used to attempt to gain access to some secured area (e.g., office, room, data center, safe, etc.). The access control information can indicate whether credentials associated with a given entity were permitted or denied access to a given secured area. The environment data engine 208 can also obtain map information from data systems associated with the secure facility. The map information can provide visual maps of the secure facility and geographic regions surrounding the secure facility. In some embodiments, the map information can provide floorplans and blueprints of the secure facility. The environment data engine 208 can also obtain video data from video systems associated with the secure facility. The video data may be captured by various cameras associated with the secure facility. Many variations are possible.

Figure 3G:
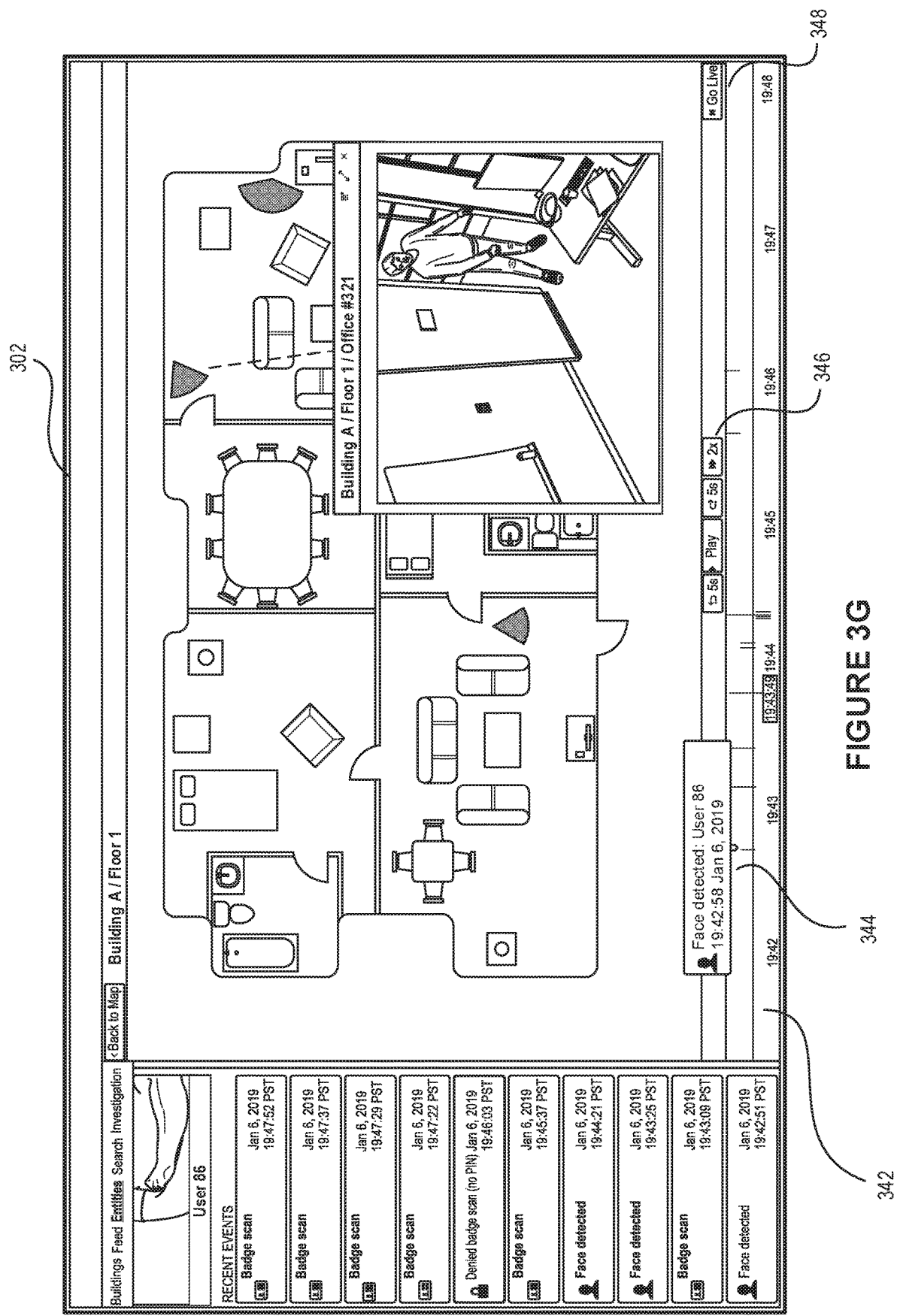

The timeline engine 210 can provide an interactive timeline of events that can be used to aid investigations. For example, an interactive timeline 342 can be provided within the interface 302 as illustrated in the example of FIG. 3G. The interactive timeline 342 can chronologically plot events that occurred over some period of time at some physical location (e.g., Office #321). The plotted events may correspond to badges read by access badge readers associated with the physical location or entities recognized at the physical location based on footage captured by cameras associated with the physical location. In the example of FIG. 3G, the interactive timeline 342 shows an event 344 corresponding to a face recognition of a particular entity at the physical location. The interface 302 also provides playback controls 346 to navigate recorded video feeds of the physical location. The playback controls 346 allow the user to scrub through stored footage for purposes of conducting the investigation. The user can also select an option 348 to view a live video feed of the physical location.

The identification management engine 212 can be configured to obtain facial recognition information that can be made accessible to users through interfaces provided by the interface engine 206. In various embodiments, the identification management engine 212 can be supported by any conventional, third-party facial recognition technology. In such embodiments, the identification management engine 212 can implement myriad "privacy by design" features to modify and override various functionality provided by facial recognition technology in an effort to safeguard privacy and civil liberty concerns that can arise when applying such technology, as described below.

Figure 3H:
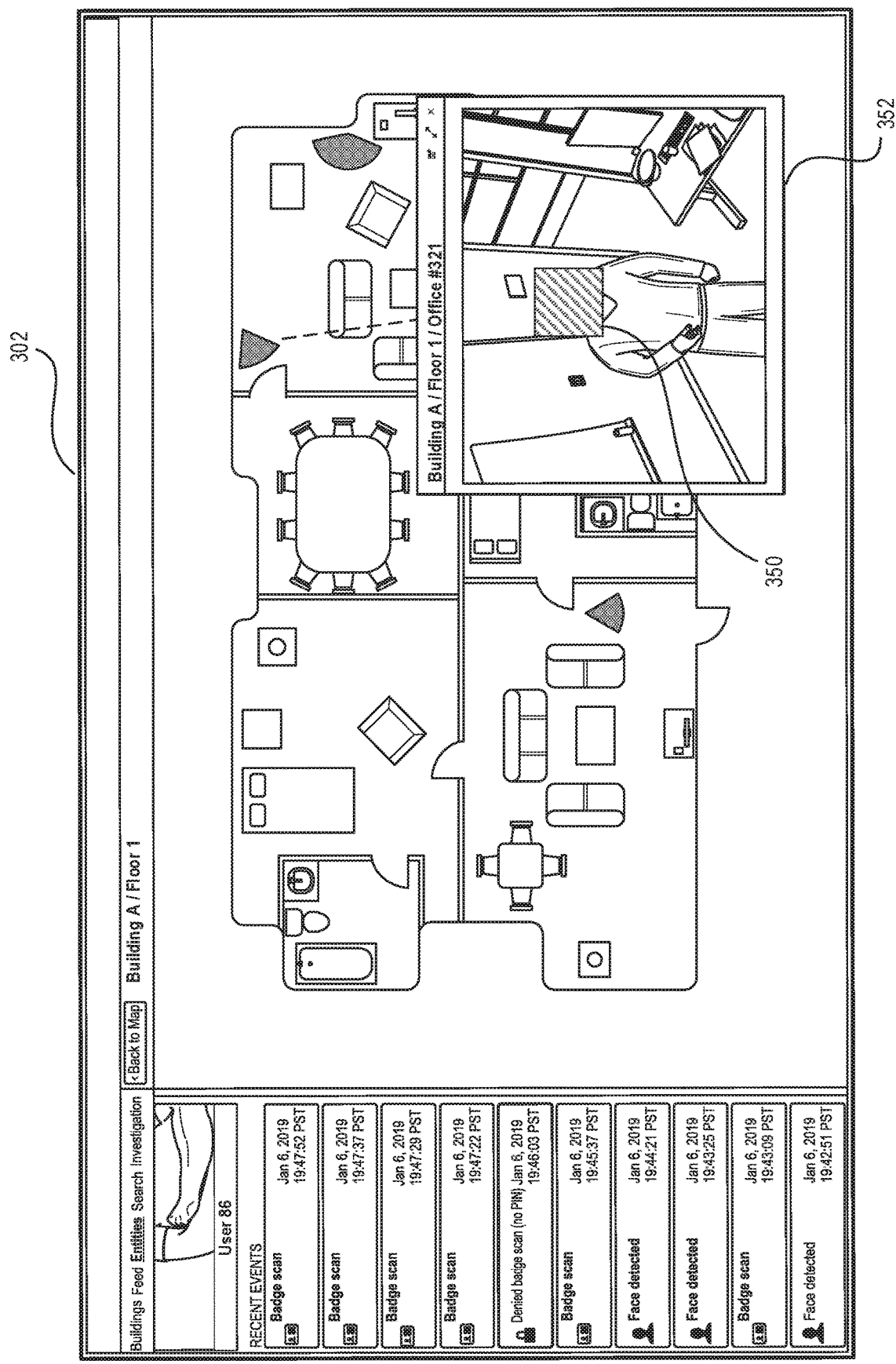

For example, in some embodiments, the identification management engine 212 can apply selective revelation principles by obfuscating faces of individuals represented in video feeds by default. FIG. 3H illustrates an example obfuscation 350 of a facial recognition of an individual identified in a video feed 352 by conventional facial recognition technology. In some embodiments, the identification management engine 212 can provide facial recognition information for individuals without obfuscation provided those individuals are associated with a watch list (or people of interest list). When multiple individuals are represented in a video frame, the identification management engine 212 can selectively show or obscure facial recognition information for those individuals depending on whether they are associated with a watch list. In some embodiments, the identification management engine 212 can provide facial recognition information for individuals without obfuscation if those individuals are present within a highly secure facility within a secure facility which requires on or more credentials to access.

Figure 3I:
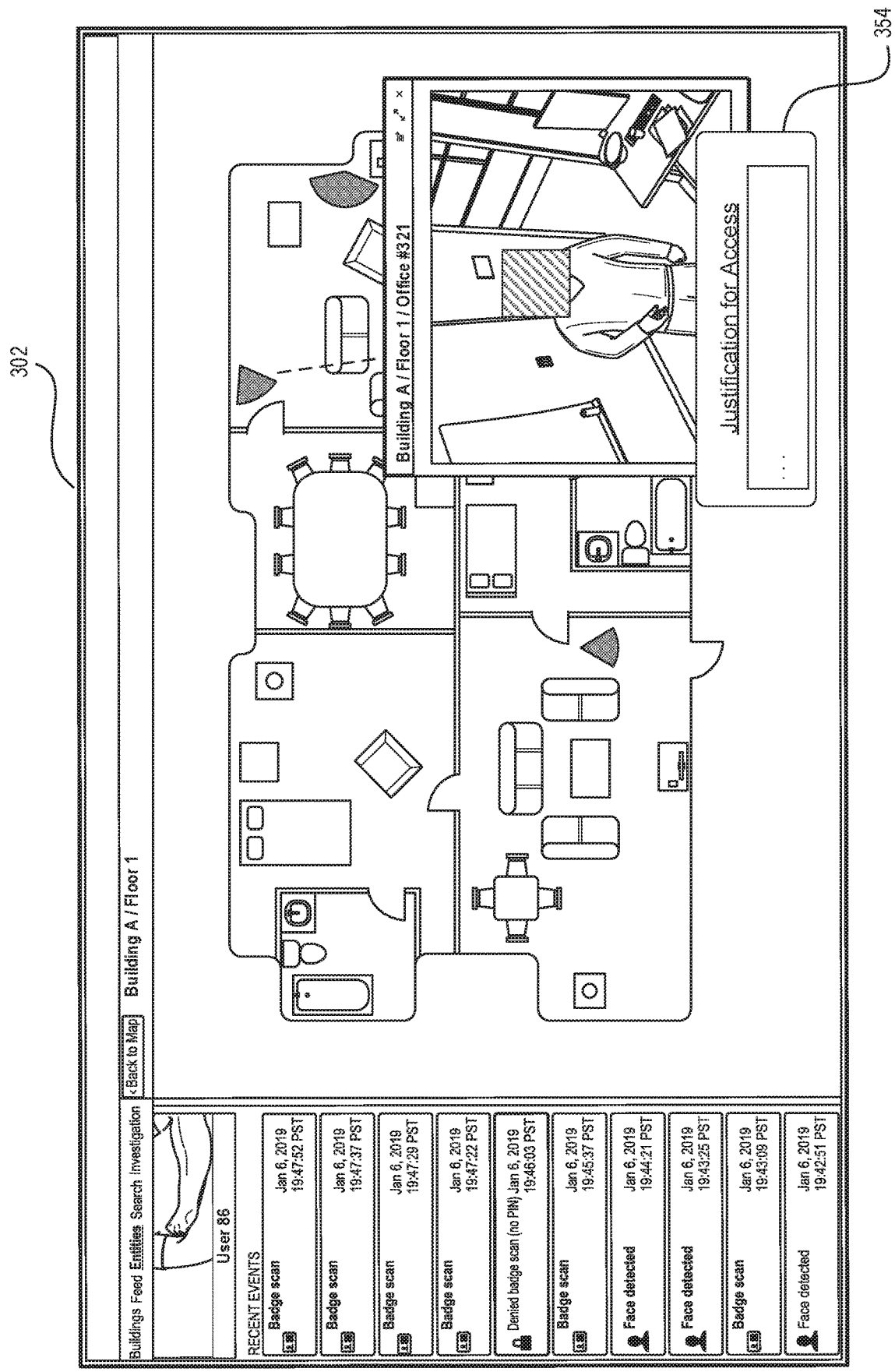

In some embodiments, the identification management engine 212 can require users to provide justifications for certain types of actions. For example, users having appropriate authorization may selectively reveal an obfuscated face recognition, for example, by providing a justification 354, as illustrated in the example of FIG. 3I. The justification 354 may be provided as free-form text or by selecting one or more pre-defined options. In general, all justifications provided by users are recorded and reviewable as an audit log. Another example of when a justification can be required is when a user attempts to run a facial recognition search of a known individual despite no alert having been triggered. For example, an alert may be triggered when an individual on a watch list is recognized within a secure facility. In this example, a facial recognition search of the individual can be permitted since the individual appears on the watch list. In contrast, if no such alert was triggered, a justification for running a facial recognition search for the individual is required. In some embodiments, a justification can be required when a user designates an individual to be added to a watch list (or people of interest list). In such embodiments, a valid justification may be that the individual was seen within a secure area during a certain time frame or that the individual was seen accompanying another individual that is associated with a watch list.

In some embodiments, the identification management engine 212 can implement layered data access controls to all visual data (e.g., images, videos) captured by cameras associated with a secure facility. For example, users may only be permitted to reveal obfuscated imagery if they have appropriate access credentials. In some embodiments, a user without appropriate access credentials may be permitted to escalate their privileges to access visual data from different buildings, floors, and cameras, for example, by providing an appropriate justification. Further, when a user escalates their privileges to access live or recorded video from a particular location (within a building or different building), the user must also specify (and a supervisor must confirm) a reasonable time window that bounds their access to the video data and is proportional to the stated justification. Moreover, in such embodiments, privilege escalation must also be time-bound. For example, user access may be escalated for the duration of an investigation or for a specified time period.

In some embodiments, the identification management engine 212 can provide tools to vet and modify conventional face recognition technology to promote fairness. For example, the identification management engine 212 can help promote fairness by applying assessments (e.g., parameters) promulgated by the National Institute of Standards and Technology (NIST) to deployed facial recognition technologies as a baseline evaluation. The identification management engine 212 can also provide tools that permit administrative modification of thresholds used by deployed facial recognition technology. For instance, the identification management engine 212 can provide an option to increase a threshold confidence score that must be satisfied before a face recognition match is identified. In this example, the increased threshold confidence score can override any related thresholds relied upon by the default configuration of the deployed facial recognition technology. The identification management engine 212 can also provide tools for evaluating—in active use—the efficacy of face recognition technology deployed for a particular environment. The efficacy can be based on the accuracy with which the deployed face recognition technology identifies individuals. This efficacy can be refined over time as matches identified by the deployed technology are confirmed or rejected by human users. A confidence score associated with a face recognition can provide human users with a measure of accuracy for the face recognition. Further, the identification management engine 212 can provide redress tools. For example, the redress tools may be needed when an individual is incorrectly recognized as a different individual or when an individual is erroneously included in a watch list.

In some embodiments, the identification management engine 212 can provide tools to improve data quality and correct erroneous face recognition matches. For example, a false positive alert may be triggered when deployed face recognition technology incorrectly recognizes a person as an individual included in a watch list. In this example, the identification management engine 212 provides tools to remove any associations between the falsely matched person and visual data from which the false identification was made. Such corrections can be included in an audit log to ensure appropriate documentation. In some embodiments, human users can confirm or deny face recognitions made by a deployed face recognition technology and these confirmations and denials can be provided back to the deployed technology for further training in an effort to reduce erroneous face recognition matches over time.

In some embodiments, the identification management engine 212 can enforce policies related to data collection and retention. For example, the identification management engine 212 can be configured to access visual data based on a pre-defined system configuration. That is, any cameras associated with an environment must be pre-defined and any changes to the camera configuration will require administrator approval (e.g., changes such as adding cameras, removing cameras, repositioning cameras, etc.). In general, all cameras must exist in approved physical locations. Thus, all visual data must be captured from approved cameras placed in approved physical locations. As a result, the identification management engine 212 can reject (i.e., not display) visual data provided by unrecognized cameras or from prohibited physical locations.

The identification management engine 212 can also enforce special rules with respect to people data. For example, any face recognition matches made by deployed face recognition technology should be managed through "seed lists" of facial profiles, which can be configured by administrators. Further, adding a person (or a list of people) to a seed list must include identifying information for each person and an associated justification for adding that person. For example, a user associated with an organization may add a person to a seed list with a justification that the person was fired from the organization with cause. In this example, a facial profile of the person can be included in the seed list and subsequently used to identify that person in video feeds. In some embodiments, adding a person to a seed list may require approval from one or more administrators. Similarly, removing a person from a seed list can require an associated justification and may require approval from one or more administrators. In general, information describing additions and removals of persons from seed lists can be logged in an audit log. In some embodiments, the identification management engine 212 can apply retention policies to seed lists. For example, the identification management engine 212 can require seed lists be subject to mandatory review and require reconfirmation of membership at least every 6 months. In some embodiments, the identification management engine 212 can limit retention of face recognition signatures that correspond to unknown persons. For example, unknown face recognition signatures (i.e., faces that do not match facial profiles in seed lists) can be retained for a limited period of time (e.g., zero days). Alternatively, the identification management engine 212 can also enforce a maximum retention window configuration for such unknown face recognition signatures to ensure data is not retained for unreasonably long periods of time. The identification management engine 212 can also enforce a maximum retention window configuration (e.g., 30 days) of face recognition signatures that matched known persons. Many variations are possible.

The identification management engine 212 can also be configured to purposefully limit capabilities provided by deployed face recognition technology. For example, the identification management engine 212 can intentionally exclude any functionality provided by the deployed face recognition technology relating to inferred characteristics, such as race, gender, or other similar traits.

Figure 3J:
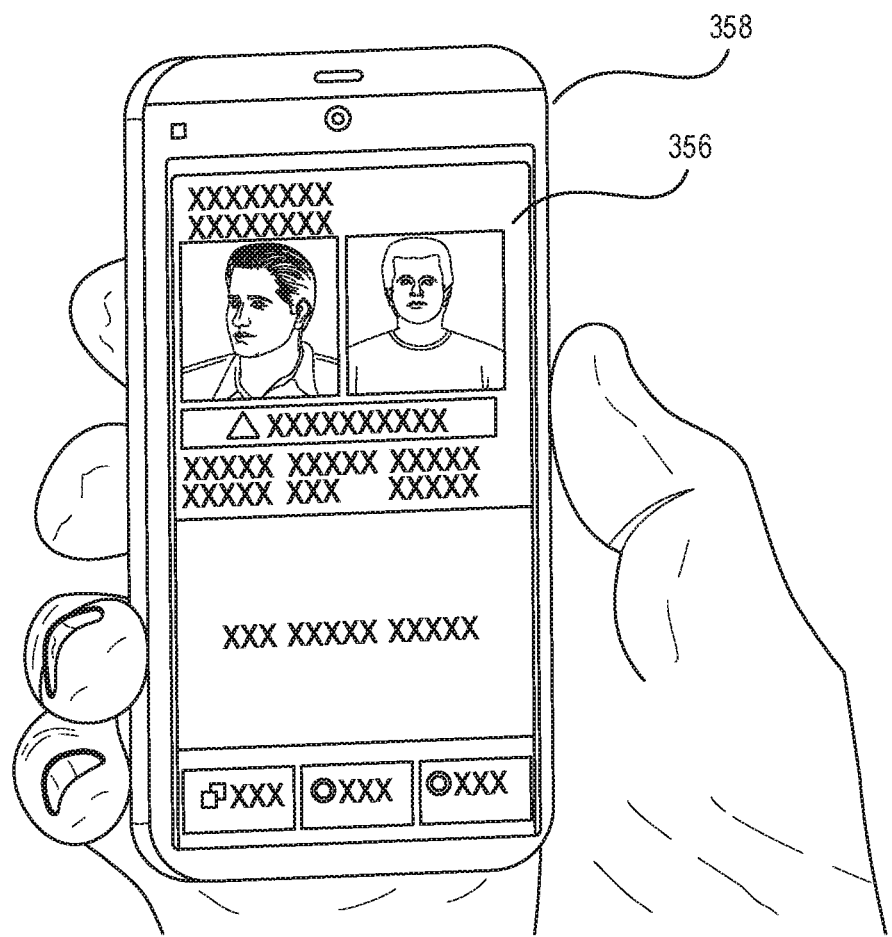

The alert engine 214 can be configured to generate alerts describing suspicious activity. In some embodiments, the alert engine 214 can generate an alert when a face recognition of an individual does not correspond to a facial profile associated with a credential used by that individual. For example, in a stadium setting, persons entering the stadium may be required to pass through a gate (or turnstile). The gate can be associated with an access control reader and one or more cameras that capture visual data of those entering through the gate. In this example, a person can scan their credentials (e.g., badge, ID bracelet, etc.) at the access control reader to attempt entry. When the credential is scanned, the alert engine 214 can obtain a facial profile associated with the credential. The alert engine 214 can also obtain facial recognition information describing the person from deployed facial recognition technology that analyzes visual data captured by the one or more cameras. In this example, the person can be granted entry if the facial recognition information describing the person matches the facial profile associated with the credential. However, if no match is determined between the facial recognition information and the facial profile, then the alert engine 214 can generate one or more alerts describing the suspicious activity. For example, in some embodiments, an alert 356 can be provided to security personnel through a mobile computing device 358, as illustrated in the example of FIG. 3J. Many variations are possible.

Figure 4:
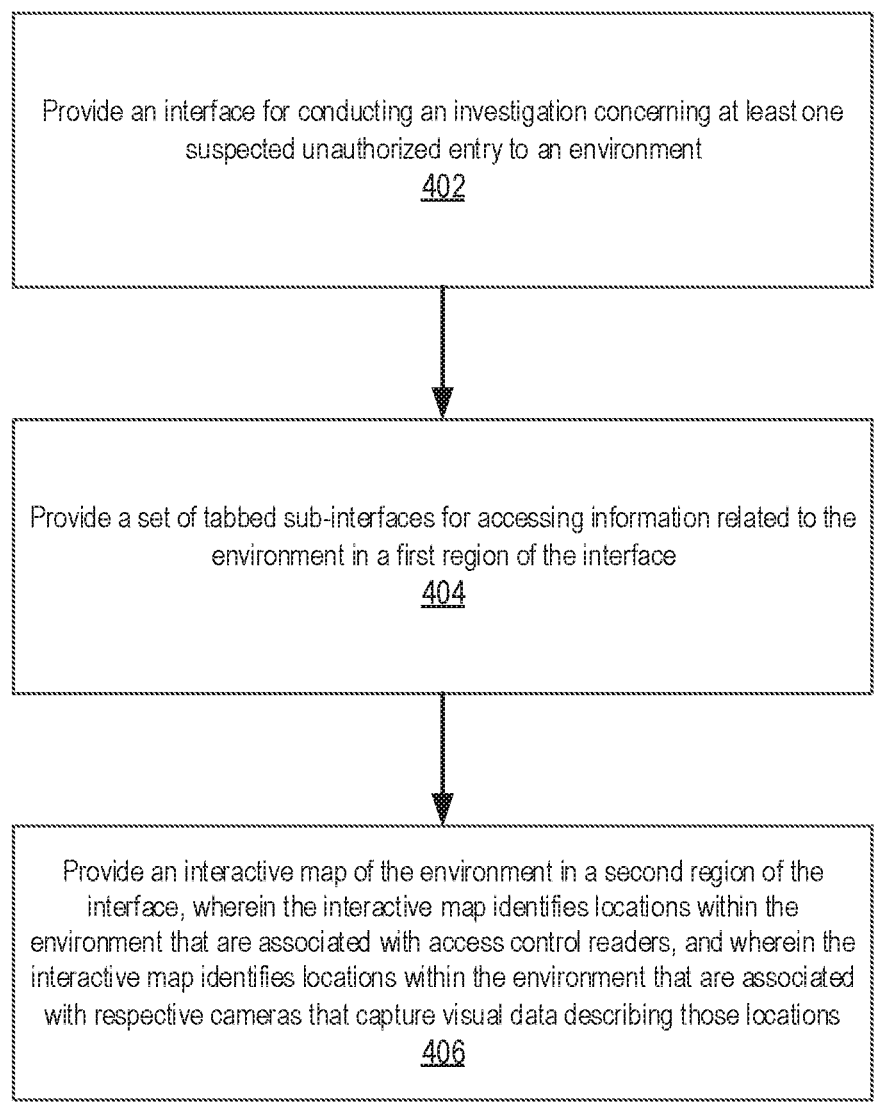
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 200 of FIG. 2. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, an interface for conducting an investigation concerning at least one suspected unauthorized entry to an environment can be provided. At block 404, a set of tabbed sub-interfaces for accessing information related to the environment can be provided in a first region of the interface. At block 406, an interactive map of the environment can be provided in a second region of the interface, wherein the interactive map identifies locations within the environment that are associated with access control readers, and wherein the interactive map identifies locations within the environment that are associated with respective cameras that capture visual data describing those locations.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
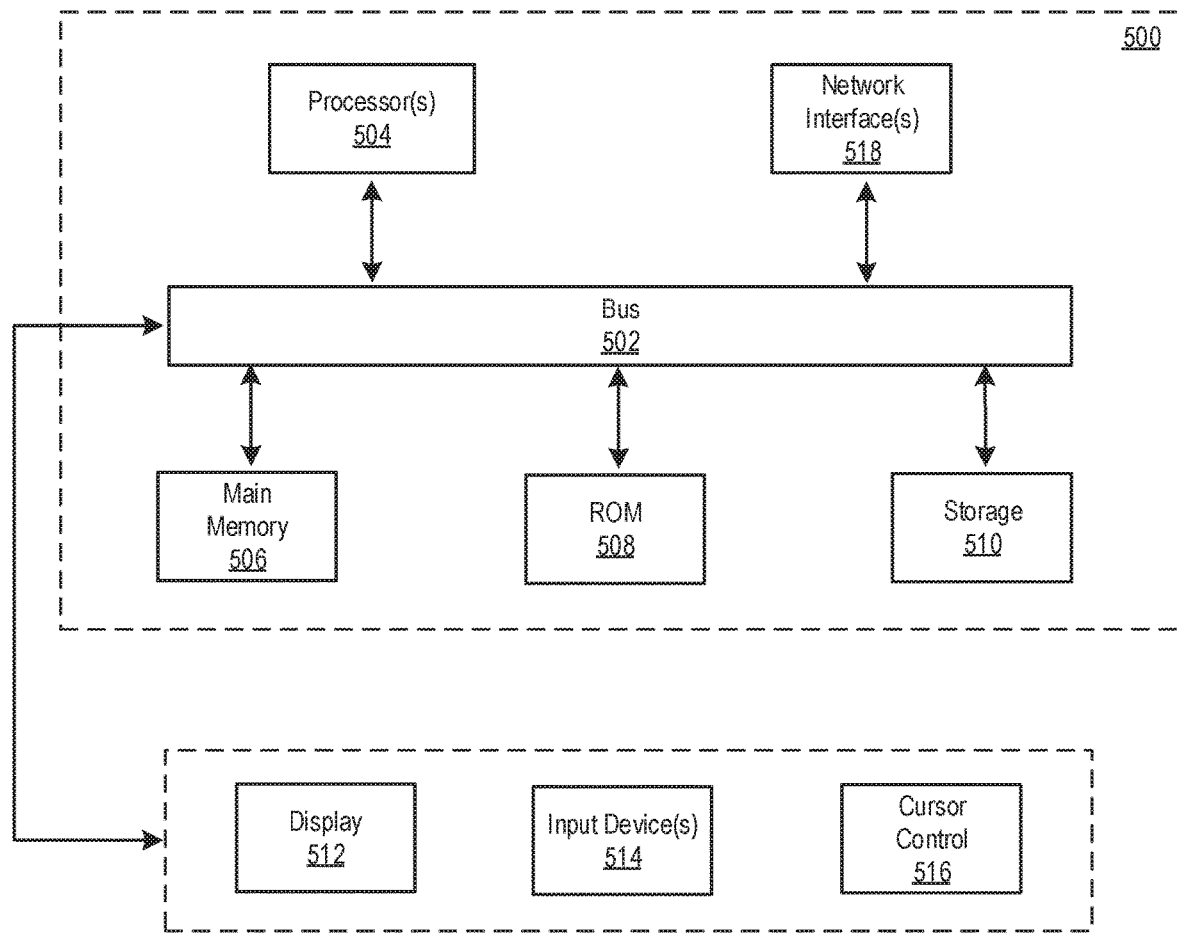
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module (or engine) to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules (or engines) may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
providing an interface for conducting an investigation concerning at least one suspected unauthorized entry to an environment;
receiving an indication of an identification of an object associated with the suspected unauthorized entry;
providing a set of tabs corresponding to a set of tabbed sub-interfaces for accessing information related to the environment in a first region of the interface;
providing an interactive map of the environment in a second region or in a first tab of the interface, wherein the interactive map identifies locations within the environment that are associated with access control readers, and wherein the interactive map identifies locations within the environment that are associated with respective cameras that capture visual data describing those locations;
receiving an indication of a camera on the interactive map;
in response to receiving the indication of the camera, obtaining a video feed captured by the camera;
receiving, within the second region or the first tab, a first selection comprising a first tag associated with the video feed, wherein:
the video feed comprises a captured event that occurred before the first selection of the first tag, and
the first selection comprises selecting a video clip from the video feed; and
in response to receiving the first selection, tagging the video feed with the investigation;
when a second tab of the set of tabs is selected:
displaying a list of access control events of the object associated with the environment in a second tabbed sub-interface corresponding to the second tab;
receiving a second selection comprising a second tag associated with an access control event from the list of access control events for tagging the access control event with the investigation; and
in response to receiving the second selection, tagging the access control event with the investigation; and
when a third tab of the set of tabs is selected:
upon receiving the first selection from the first tab or the second region and the second selection from the second tab, displaying, in the first region of the interface, the video feed tagged in the first tab or the second region and the access control event tagged in the second tab or a representation of the video feed and the access control event.

2. The system of claim 1, wherein the access control event identifies a badge that was read by an access control reader associated with the environment or the object that was recognized based on visual data captured by a camera associated with the environment.

3. The system of claim 1, wherein the set of tabbed sub-interfaces includes a fourth tab for accessing information describing objects that are permitted to access the environment, the information indicating at least when a badge associated with a given object was read by an access control reader and when the given object was recognized in visual data captured by a camera associated with the environment.

4. The system of claim 1, wherein the instructions further cause the system to perform:
determining that a badge read by an access control reader is associated with an authorized object;
determining that the object that presented the badge to the access control reader fails to match a profile associated with the authorized object; and
generating one or more alerts that describe the suspected unauthorized entry to the environment.

5. The system of claim 1, wherein the instructions further cause the system to perform:
providing at least one option in the interactive map for viewing recorded or live visual data captured by a camera associated with the environment.

6. The system of claim 5, wherein features of objects represented in the visual data are obfuscated by default, and wherein the interface provides one or more options for submitting one or more justifications to selectively reveal the objects.

7. The system of claim 1, wherein the interface provides one or more options for associating information related to the environment with the investigation, the one or more options including at least a first option to associate an event identifying a badge that was read by an access control reader with the investigation and at least a second option to associate visual data in which the object was identified with the investigation.

8. The system of claim 1, wherein the instructions further cause the system to perform:
when the first tab of the set of tabs is selected:
obtaining information from a feature of the object;

determining, based on the information, whether the object is associated with individuals on a watch list;
in response to the object being associated with individuals on the watch list, displaying the video feed with the feature of the object; and
in response to the object not being associated with individuals on a watch list, displaying the video feed while obfuscating the feature of the object.

9. The system of claim 8, wherein the instructions further cause the system to perform:
in response to the object not being associated with individuals on a watch list, receiving an indication to add the object to a watch list based on the object being within a secure location during a certain time frame or based on the object accompanying a second object associated with the watch list;
adding the object to the watch list; and
changing the video feed to display the object.

10. The system of claim 8, wherein the instructions further cause the system to perform:
in response to the object being associated with individuals on the watch list, receiving an indication that the object is erroneously identified as being associated with individuals on the watch list;
removing one or more associations between the object and the information from which the determination was made that the object is associated with individuals on a watch list; and
changing the video feed to obfuscate a feature of the object.

11. A computer-implemented method, comprising:
providing an interface for conducting an investigation concerning at least one suspected unauthorized entry to an environment;
receiving an indication of an identification of an object associated with the suspected unauthorized entry;
providing a set of tabs corresponding to a set of tabbed sub-interfaces for accessing information related to the environment in a first region of the interface;
providing an interactive map of the environment in a second region or in a first tab of the interface, wherein the interactive map identifies locations within the environment that are associated with access control readers, and wherein the interactive map identifies locations within the environment that are associated with respective cameras that capture visual data describing those locations;
receiving an indication of a camera on the interactive map;
in response to receiving the indication of the camera, obtaining a video feed captured by the camera;
receiving, within the second region or the first tab, a first selection comprising a first tag associated with the video feed, wherein:
the video feed comprises a captured event that occurred before the first selection of the first tag, and
the first selection comprises selecting a video clip from the video feed; and
in response to receiving the first selection, tagging the video feed with the investigation;
when a second tab of the set of tabs is selected:
displaying a list of access control events of the object associated with the environment in a second tabbed sub-interface corresponding to the second tab;
receiving a second selection comprising a second tag associated with an access control event from the list of access control events for tagging the access control event with the investigation; and
in response to receiving the second selection, tagging the access control event with the investigation; and
when a third tab of the set of tabs is selected:
upon receiving the first selection from the first tab or the second region and the second selection from the second tab, displaying, in the first region of the interface, the video feed tagged in the first tab or the second region and the access control event tagged in the second tab or a representation of the video feed and the access control event.

12. The computer-implemented method of claim 11, wherein the access control event identifies a badge that was read by an access control reader associated with the environment or the object that was recognized based on visual data captured by a camera associated with the environment.

13. The computer-implemented method of claim 11, wherein the set of tabbed sub-interfaces includes a fourth sub-interface for accessing information describing objects that are permitted to access the environment, the information indicating at least when a badge associated with a given object was read by an access control reader and when the object was recognized in visual data captured by a camera associated with the environment.

14. A non-transitory computer readable medium comprising instructions that, when executed, cause one or more processors of a computing system to perform:
providing an interface for conducting an investigation concerning at least one suspected unauthorized entry to an environment;
receiving an indication of an identification of an object associated with the suspected unauthorized entry;
providing a set of tabs corresponding to a set of tabbed sub-interfaces for accessing information related to the environment in a first region of the interface;
providing an interactive map of the environment in a second region or in a first tab of the interface, wherein the interactive map identifies locations within the environment that are associated with access control readers, and wherein the interactive map identifies locations within the environment that are associated with respective cameras that capture visual data describing those locations;
receiving an indication of a camera on the interactive map;
in response to receiving the indication of the camera, obtaining a video feed captured by the camera;
receiving, within the second region or the first tab, a first selection comprising a first tag associated with the video feed, wherein:
the video feed comprises a captured event that occurred before the first selection of the first tag, and
the first selection comprises selecting a video clip from the video feed; and
in response to receiving the first selection, tagging the video feed with the investigation;
when a second tab of the set of tabs is selected:
displaying a list of access control events of the object associated with the environment in a second tabbed sub-interface corresponding to the second tab;
receiving a second selection comprising a second tag associated with an access control event from the list of access control events for tagging the access control event with the investigation; and
in response to receiving the second selection, tagging the access control event with the investigation; and when a third tab of the set of tabs is selected:
upon receiving the first selection from the first tab or the second region and the second selection from the second tab, displaying, in the first region of the interface, the video feed tagged in the first tab or the second region and the access control event tagged in the second tab or a representation of the video feed and the access control event.

15. The non-transitory computer readable medium of claim 14, wherein the set of tabbed sub-interfaces includes a fourth tab for accessing information describing objects that are permitted to access the environment, the information indicating at least when a badge associated with a given object was read by an access control reader and when the given object was recognized in visual data captured by a camera associated with the environment.

* * * * *